United States Patent
Garbus et al.

(10) Patent No.: US 10,637,301 B2
(45) Date of Patent: Apr. 28, 2020

(54) DUAL PROTOCOL WIRELESS POWER SYSTEM

(71) Applicant: Apple Inc., Cupertino, CA (US)

(72) Inventors: Brandon R. Garbus, Santa Clara, CA (US); Matthew G. Czapar, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 85 days.

(21) Appl. No.: 15/881,588

(22) Filed: Jan. 26, 2018

(65) Prior Publication Data

US 2019/0058360 A1     Feb. 21, 2019

Related U.S. Application Data

(60) Provisional application No. 62/546,421, filed on Aug. 16, 2017.

(51) Int. Cl.
*H02J 50/80* (2016.01)
*H02J 50/10* (2016.01)
(Continued)

(52) U.S. Cl.
CPC ............ *H02J 50/80* (2016.02); *H02J 7/0027* (2013.01); *H02J 7/025* (2013.01); *H02J 50/10* (2016.02);
(Continued)

(58) Field of Classification Search
CPC ............... H02J 50/00; H02J 7/00; H02J 50/80
(Continued)

(56) References Cited

U.S. PATENT DOCUMENTS 9,209,627 B2   12/2015   Baarman et al.
9,264,108 B2   2/2016    Von Novak, III
(Continued)

FOREIGN PATENT DOCUMENTS

CN          103414819 A      11/2013

OTHER PUBLICATIONS

"Introduction to RT 1650 Wireless Power Receiver" Sep. 30, 2015 [Retrieved on Apr. 18, 2018 from http://www.richtek.com/en/design%20Support/Techinical%20Document/~/media/AN%20PDF/AN036_EN.ashx].

(Continued)

*Primary Examiner* — Hal Kaplan
*Assistant Examiner* — Joseph N Inge
(74) *Attorney, Agent, or Firm* — Treyz Law Group, P.C.; G. Victor Treyz; Joseph F. Guihan (57) ABSTRACT

Multiple wireless power receiving devices operating in accordance with potentially different wireless charging protocols may be placed on a wireless power transmitting device. The wireless power transmitting device sends a frequency-shift-keying packet. If a wireless power receiving device is compliant with a first wireless charging protocol, the device responds to the frequency-shift-keying packet with an amplitude-shift-keying response packet. If the wireless power receiving device is compliant with a second wireless charging protocol, the wireless power receiving device will fail to respond to the frequency-shift-keying packet and the wireless power transmitting device responds by stopping and starting wireless power transmission and awaiting an amplitude-shift-keying packet from the wireless power receiving device in accordance with the second wireless charging protocol.

17 Claims, 4 Drawing Sheets

(51) Int. Cl.
*H04B 5/00* (2006.01)
*H02J 50/60* (2016.01)
*H02J 7/02* (2016.01)
*H02J 7/00* (2006.01)
*H02J 50/12* (2016.01)
*H02J 50/40* (2016.01)

(52) U.S. Cl.
CPC .............. *H02J 50/12* (2016.02); *H02J 50/40* (2016.02); *H02J 50/60* (2016.02); *H04B 5/0037* (2013.01)

(58) Field of Classification Search
USPC ........................................................ 307/104
See application file for complete search history.

(56) References Cited

U.S. PATENT DOCUMENTS

| | | |
|---|---|---|
| 9,356,475 B2 | 5/2016 | Kim et al. |
| 9,423,439 B2 | 8/2016 | Jung et al. |
| 9,735,584 B2 | 8/2017 | Taylor et al. |
| 2013/0099735 A1 | 4/2013 | Partovi |
| 2014/0191710 A1* | 7/2014 | van Lammeren ....... H02J 5/005 320/108 |
| 2015/0155918 A1* | 6/2015 | Van Wageningen ......................... H04B 5/0031 307/104 |
| 2015/0244201 A1* | 8/2015 | Chu ......................... H02J 7/025 320/108 |
| 2016/0065005 A1* | 3/2016 | Won ..................... H04B 5/0037 |
| 2016/0254705 A1 | 9/2016 | Jung et al. |
| 2016/0329755 A1* | 11/2016 | Park ........................ H02J 7/025 |
| 2017/0061142 A1* | 3/2017 | Niessen ................. G06F 21/604 |

OTHER PUBLICATIONS

Li, Ultra Low Power FSK Receiver and RF Energy Harvester, Department of Electrical an Computer Engineering, 2012, 220 pages.
Panchal et al., Investigation of flux leakages and EMC problems in wireless charging systems for EV and other mobile applications, Environmental Electromagnetics (CEEM) 2012 6th Asia-Pacific Conference on, pp. 301-304, 2012.

* cited by examiner

DUAL PROTOCOL WIRELESS POWER SYSTEM

This application claims the benefit of provisional patent application No. 62/546,421, filed Aug. 16, 2017, which is hereby incorporated by reference herein in its entirety.

FIELD

This relates generally to power systems, and, more particularly, to wireless power systems for charging electronic devices.

BACKGROUND

In a wireless charging system, a wireless charging mat wirelessly transmits power to a portable electronic device that is placed on the mat. The portable electronic device has a receiving coil and rectifier circuitry for receiving wireless alternating-current (AC) power from a coil in the wireless charging mat that is overlapped by the receiving coil. The rectifier converts the received AC power into direct-current (DC) power.

SUMMARY

A wireless power transmitting device has a single coil or an array of coils to transmit power wirelessly to a wireless power receiving device. The receiving device has a coil and rectifier that receive wirelessly transmitted power signals and provide corresponding direct-current power to a battery and other internal circuitry.

Multiple wireless power receiving devices operating in accordance with potentially multiple wireless charging protocols may be placed on a charging surface of the wireless power transmitting device. Upon detection of an external object on the charging surface, the wireless power transmitting device transmits an in-band frequency-shift-keying packet in an attempt to establish communications with a wireless power receiving device.

If a wireless power receiving device on the charging surface is compliant with a first wireless charging protocol, the wireless power receiving device may respond to the frequency-shift-keying packet with an amplitude-shift-keying response packet. An appropriate power level with which to transmit wireless power from the wireless power transmitting device may then be negotiated between the wireless power transmitting and wireless power receiving devices.

If a wireless power receiving device on the charging surface is compliant with a second wireless charging protocol, the wireless power receiving device will fail to respond to the frequency-shift-keying packet and the wireless power transmitting device can, in response to failing to receive an amplitude-shift-keying packet from the wireless power transmitting device, respond by stopping and starting wireless power transmission (e.g., powering down and restarting) and awaiting an amplitude-shift-keying packet from the wireless power receiving device in accordance with the second wireless charging protocol.

DETAILED DESCRIPTION

A wireless power system may have a wireless power transmitting device such as wireless charging mat. The wireless power transmitting device may wirelessly transmit power to a wireless power receiving device such as a wristwatch, cellular telephone, tablet computer, laptop computer, or other electronic equipment. The wireless power receiving device may use power from the wireless power transmitting device for powering the device and for charging an internal battery.

In some scenarios, a user may place multiple wireless power receiving devices in the vicinity of a wireless power transmitting device. Wireless power receiving devices may also use different wireless charging protocols. To enhance the ability of a user to charge one or more devices that potentially use different wireless charging protocols, a wireless power transmitting device may be configured to support multiple simultaneous wireless power receiving devices and/or different wireless power receiving protocols.

Figure 1:
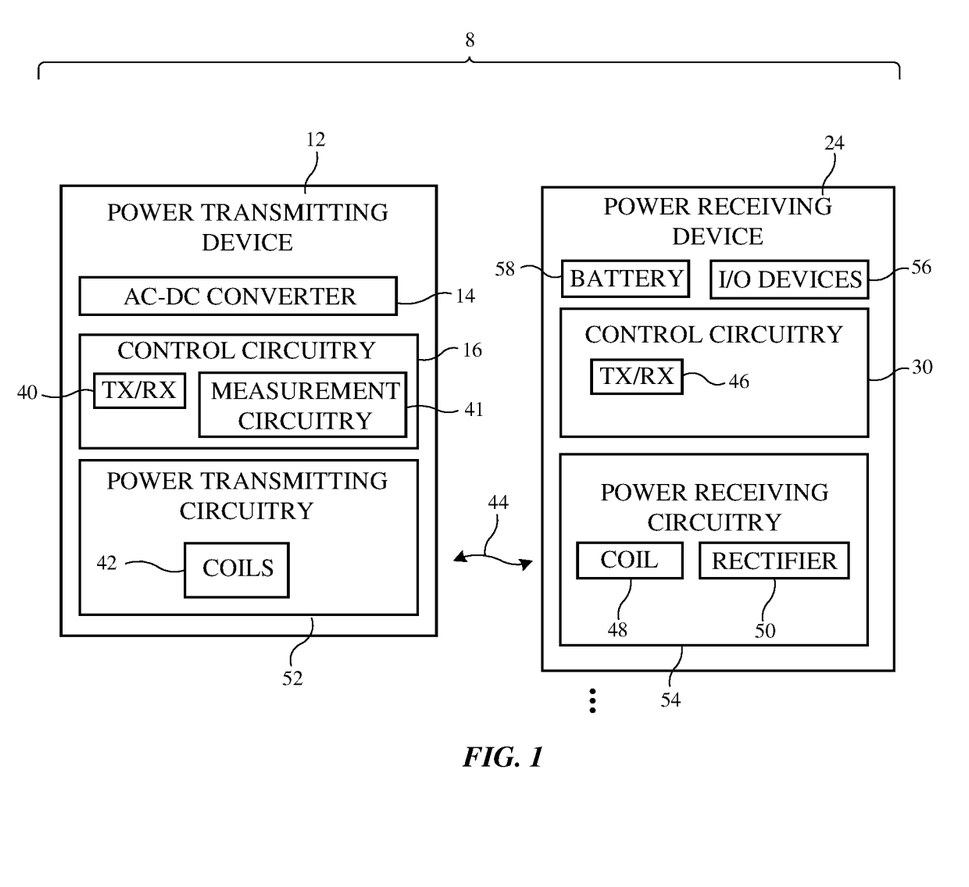
FIG. 1 is a schematic diagram of an illustrative wireless charging system that includes a wireless power transmitting device and a wireless power receiving device in accordance with an embodiment.

An illustrative wireless power system (wireless charging system) is shown in FIG. 1. As shown in FIG. 1, wireless power system 8 may include a wireless power transmitting device such as wireless power transmitting device 12 and may include a wireless power receiving device such as wireless power receiving device 24. Wireless power transmitting device 12 may include control circuitry 16. Wireless power receiving device 24 may include control circuitry 30. Control circuitry in system 8 such as control circuitry 16 and control circuitry 30 may be used in controlling the operation of system 8. This control circuitry may include processing circuitry associated with microprocessors, power management units, baseband processors, digital signal processors, microcontrollers, and/or application-specific integrated circuits with processing circuits. This processing circuitry implements desired control and communications features in devices 12 and 24. For example, the processing circuitry may be used in determining power transmission levels, processing sensor data, processing user input, handling negotiations between devices 12 and 24, sending and receiving in-band and out-of-band data packets, and processing other information and using this information to adjust the operation of system 8.

Control circuitry in system 8 may be used to authorize components to use power and ensure that components do not exceed maximum allowable power consumption levels. Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile randomaccess memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat that includes power adapter circuitry), may be a wireless charging mat that is coupled to a power adapter or other equipment by a cable, may be a portable device, may be equipment that has been incorporated into furniture, a vehicle, or other system, or may be other wireless power transfer equipment. Illustrative configurations in which wireless power transmitting device 12 is a wireless charging mat may sometimes be described herein as an example.

Power receiving device 24 may be a portable electronic device such as a wristwatch, a cellular telephone, a laptop computer, a tablet computer, or other electronic equipment. Power transmitting device 12 may be coupled to a wall outlet (e.g., alternating current), may have a battery for supplying power, and/or may have another source of power. Power transmitting device 12 may have an AC-DC power converter such as power converter 14 for converting AC power from a wall outlet or other power source into DC power. DC power may be used to power control circuitry 16. During operation, a controller in control circuitry 16 may use power transmitting circuitry 52 to transmit wireless power to power receiving circuitry 54 of device 24. Power transmitting circuitry 52 may have switching circuitry (e.g., an inverter formed from transistors) that is turned on and off based on control signals provided by control circuitry 16 to create AC current signals through one or more coils 42. Coils 42 may be arranged in a planar coil array (e.g., in configurations in which device 12 is a wireless charging mat). Configurations in which a charging surface is formed from a single coil may also be used.

As the AC currents pass through one or more coils 42, alternating-current electromagnetic fields (signals 44) are produced that are received by one or more corresponding coils such as coil 48 in power receiving device 24. When the alternating-current electromagnetic fields are received by coil 48, corresponding alternating-current currents are induced in coil 48. Rectifier circuitry such as rectifier 50, which contains rectifying components such as synchronous rectification metal-oxide-semiconductor transistors arranged in a bridge network, converts received AC signals (received alternating-current signals associated with electromagnetic signals 44) from coil 48 into DC voltage signals for powering device 24.

The DC voltages produced by rectifier 50 can be used in powering a battery such as battery 58 and can be used in powering other components in device 24. For example, device 24 may include input-output devices 56 such as a display, touch sensor, communications circuits, audio components, sensors, and other components and these components may be powered by the DC voltages produced by rectifier 50 (and/or DC voltages produced by battery 58).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12.

Wireless transceiver circuitry 40 uses one or more coils 42 to transmit in-band signals to wireless transceiver circuitry 46 that are received by wireless transceiver circuitry 46 using coil 48. Any suitable modulation scheme may be used to support in-band communications between device 12 and device 24. With one illustrative configuration, frequency-shift keying (FSK) is used to convey in-band data from device 12 to device 24 and amplitude-shift keying (ASK) is used to convey in-band data from device 24 to device 12. Power is conveyed wirelessly from device 12 to device 24 during these FSK and ASK transmissions.

During wireless power transmission operations, circuitry 52 supplies AC drive signals to one or more coils 42 at a given power transmission frequency. The power transmission frequency may be, for example, a predetermined frequency of about 125 kHz. Other wireless power frequencies may be used, if desired. In general, the power transmission frequency may be a frequency of at least 80 kHz, at least 100 kHz, less than 500 kHz, less than 300 kHz, 50-200 kHz, 80-250 kHz, at least 1 MHz, less than 10 MHz, or other suitable wireless power frequency. In some configurations, the power transmission frequency may be negotiated in communications between devices 12 and 24. In other configurations, the power transmission frequency is fixed.

During wireless power transfer operations, while power transmitting circuitry 52 is driving AC signals into one or more of coils 42 to produce signals 44 at the power transmission frequency, wireless transceiver circuitry 40 uses FSK modulation to modulate the power transmission frequency of the driving AC signals and thereby modulate the frequency of signals 44. In device 24, coil 48 is used to receive signals 44. Power receiving circuitry 54 uses the received signals on coil 48 and rectifier 50 to produce DC power. At the same time, wireless transceiver circuitry 46 uses FSK demodulation to extract the transmitted in-band data from signals 44. This approach allows FSK data (e.g., FSK data packets) to be transmitted in-band from device 12 to device 24 with coils 42 and 48 while power is simultaneously being wirelessly conveyed from device 12 to device 24 using coils 42 and 48.

In-band communications between device 24 and device 12 uses ASK modulation and demodulation techniques. Wireless transceiver circuitry 46 transmits in-band data to device 12 by using a switch (e.g., one or more transistors in transceiver 46 that are coupled coil 48) to modulate the impedance of power receiving circuitry 54 (e.g., coil 48). This, in turn, modulates the amplitude of signal 44 and the amplitude of the AC signal passing through coil(s) 42. Wireless transceiver circuitry 40 monitors the amplitude of the AC signal passing through coil(s) 42 and, using ASK demodulation, extracts the transmitted in-band data from these signals that was transmitted by wireless transceiver circuitry 46. The use of ASK communications allows ASK data bits (e.g., ASK data packets) to be transmitted in-band from device 24 to device 12 with coils 48 and 42 while power is simultaneously being wirelessly conveyed from device 12 to device 24 using coils 42 and 48.

Control circuitry 16 has external object measurement circuitry 41 (sometimes referred to as foreign object detection circuitry or external object detection circuitry) that detects external objects on a charging surface associated with device 12. Circuitry 41 can detect foreign objects such as coils, paper clips, and other metallic objects and can detect the presence of wireless power receiving devices 24.

Figure 2:
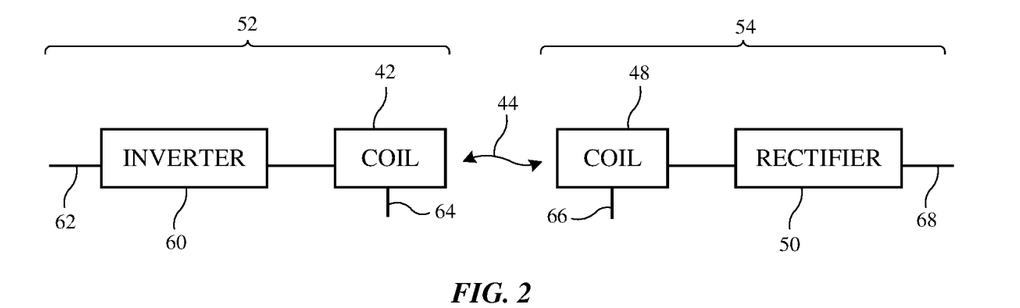
FIG. 2 is a circuit diagram of illustrative wireless power transmitting circuitry and illustrative wireless power receiving circuitry in accordance with an embodiment.

Illustrative circuitry of the type that may be used for forming power transmitting circuitry 52 and power receiving circuitry 54 of FIG. 1 is shown in FIG. 2.

As shown in FIG. 2, power transmitting circuitry 52 may include drive circuitry such as inverter 60 that is coupled by switching circuitry to coils such as coil 42 in an array of coils 42. The switching circuitry can be dynamically configured to switch desired coil(s) 42 into use. A single coil 42 and associated inverter 60 is shown in FIG. 2.

Inverter 60 has metal-oxide-semiconductor transistors or other suitable transistors that are modulated by an AC control signal from control circuitry 16 (FIG. 1) that is received on control signal input 62. The attributes of the AC control signal (e.g., duty cycle, etc.) may be adjusted dynamically during power transmission to control the amount of power being transmitted from device 12 to device 24. An FSK transmitter in wireless transceiver circuitry 40 transmit in-band FSK data to device 24 by using FSK to modulate the frequency of the AC control signal (sometimes referred to as the power transmission frequency). To receive ASK data from device 24, an ASK receiver in wireless transceiver circuitry 40 (e.g., a receiver coupled to coil 42 via path 64) demodulates the AC signal passing through coil 42 using ASK demodulation. This ASK demodulation process extracts ASK data that was transmitted from an ASK transmitter in transceiver circuitry 46 (e.g., ASK data transmitted by the ASK transmitter by modulating coil 48 using a switch coupled to coil 48 via a path such as path 66). A path such as path 66 may also be used by an FSK receiver in transceiver circuitry 46 to observe frequency changes in signals 44 (e.g., the corresponding signals induced in coil 48). The FSK receiver uses FSK demodulation to receive the transmitted in-band FSK data from device 12.

Figure 3:
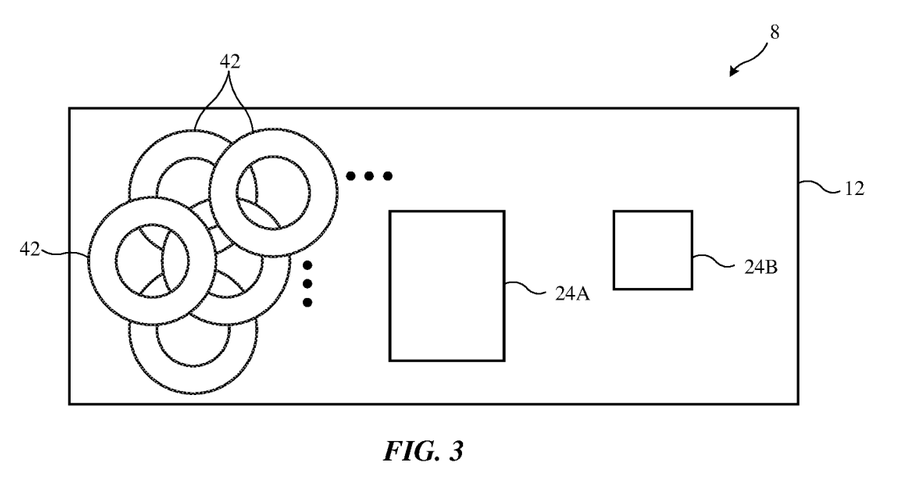
FIG. 3 is a top view of an illustrative wireless power transmitting device on which multiple wireless power receiving devices have been placed in accordance with an embodiment.

A top view of an illustrative configuration for device 12 in which device 12 has an array of coils 42 is shown in FIG. 3. Device 12 may, in general, have any suitable number of coils 42 (e.g., 22 coils, at least 5 coils, at least 10 coils, at least 15 coils, fewer than 30 coils, fewer than 50 coils, etc.). Coils 42 may be arranged in rows and columns and may or may not overlap each other.

A user of system 8 may sometimes place multiple wireless power receiving devices on device 12. For example, a user may place devices 24A and 24B (and, if desired, one or more additional devices) on device 12. Devices 24A and 24B may or may not use the same wireless charging protocol. A user of system 8 may also place individual devices 24 on device 12 and these devices may sometimes be compliant with different wireless charging protocols.

System 8 is configured to accommodate the potential use of multiple wireless charging protocols and/or the simultaneous presence of multiple wireless power receiving devices. Illustrative operations involved in operating system 8 in the presence of one or more devices supporting one or more different wireless charging protocols are shown in the flow chart of FIG. 4.

Figure 4:
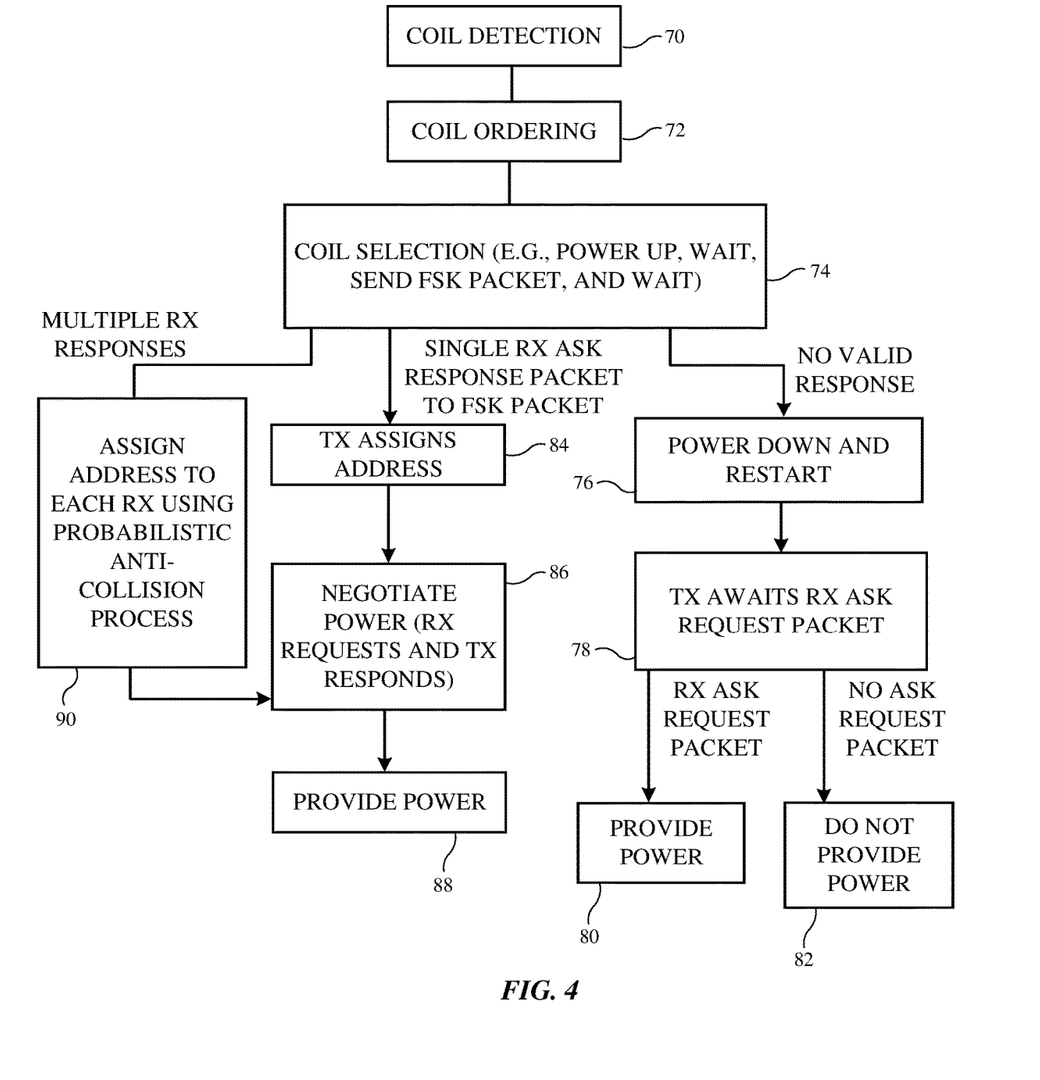
FIG. 4 is a flow chart of illustrative operations involved in providing wireless power to wireless power receiving devices in accordance with an embodiment.

During the operations of block 70, one or more object detection and characterization operations are performed by device 12 using external object measurement circuitry 41 (FIG. 1). These operations can determine whether any devices 24 are present on device 12.

In an illustrative arrangement, measurement circuitry 41 of control circuitry 16 contains signal generator circuitry (e.g., oscillator circuitry for generating AC probe signals at one or more probe frequencies, a pulse generator, etc.) and signal detection circuitry (e.g., filters, analog-to-digital converters, impulse response measurement circuits, etc.). During the operations of block 70, switching circuitry in device 12 may be adjusted by control circuitry 16 to switch each of coils 42 into use. As each coil 42 is selectively switched into use, control circuitry 16 uses the signal generator circuitry of signal measurement circuitry 41 to apply a probe signal to that coil while using the signal detection circuitry of signal measurement circuitry 41 to measure a corresponding response.

The characteristics of each coil 42 depend on whether any foreign objects overlap that coil (e.g., coins, wireless power receiving devices, etc.) and also depend on whether a wireless power receiving device with a coil such as coil 48 of FIG. 1 is present, which could increase the measured inductance of any overlapped coil 42). Signal measurement circuitry 41 is configured to measure signals at the coil while supplying the coil with signals at one or more frequencies (to measure coil impedances), signal pulses (e.g., so that impulse response measurement circuitry in the measurement circuitry can be used to make inductance and Q factor measurements), etc. Using measurements from measurement circuitry 41, the wireless power transmitting device determines whether an external object is present on the coils. If, for example, all of coils 42 exhibit their expected nominal response to the applied signals, control circuitry 16 can conclude that no external devices are present. If one of coils 42 exhibits a different response (e.g., a response varying from a normal no-objects-present baseline), control circuitry 16 can conclude that an external object (potentially a compatible wireless power receiving device) is present.

In response to detection of one or more external devices during the coil detection operations of FIG. 70 (e.g., in response to detecting elevated inductances in a set of N of coils 42 in the coil array), each of the N coils 42 can be ranked (e.g., in order from highest inductance to lowest or other suitable order) during the operations of block 72. Coil selection operations (block 74) can then be systematically performed by using each of the N coils (e.g., in ranked order) to attempt to communicate with overlapping wireless power receiving devices.

During coil selection operations at block 74, device 12 performs a power-up operation in which device 12 begins wireless power transmission. The power-up operation involves transmitting signals 44 with circuitry 52 so that an overlapping power receiving device 24 can use its rectifier 50 to power its circuitry. In this way, the circuitry of device 24 can be powered and the communications capabilities of device 24 can be made available, even if battery 58 is depleted.

After starting the power-up operations, device 12 can wait (e.g., for 10-20 ms or other suitable waiting period). During this waiting period, processing circuitry (e.g., a microprocessor, etc.) in device 24 boots up.

After the waiting period is over, device 12 sends an FSK packet (sometimes referred to as a sync packet) to device 24 using transceiver circuitry 40, followed by an additional waiting period. The duration of the additional waiting period may be 50-150 ms or other suitable time period suitable for allowing the rectified power supply output voltage and current from rectifier 50 in the wireless power receiving device that has just begun receiving wireless power to settle and be measured by current and voltage measurement circuitry in device 24. The FSK packet serves as a request for wireless power receiving devices to respond and thereby confirm their presence.

At this point, a device overlapping the currently active coil can respond to the transmitted FSK packet in accordance with its capabilities. Consider, as an example, a scenario in which the wireless power receiving devices in system 8 are compatible with different wireless charging protocols. Some of the devices may, as an example, be compatible with a first wireless charging protocol and will be capable of responding to FSK request packets from device 12, whereas other devices may be compatible with a second wireless charging protocol (different from the first protocol) and will not be capable of responding to the FSK request packets. In the first protocol, device 12 is expected to serve as a master device, while devices 24 are expected to serve as slaves that respond to the master device with information about desired transmit power levels. In the second protocol, device 12 is expected to serve as a slave to a device 24 and is expected to await an ASK request for a desired transmit power level from device 24 on power-up.

There are several possible responses to the transmitted FSK packet with this scenario.

A first possible response arises if the wireless power receiving device overlapping the active coil is compliant with the second protocol. In this scenario, the device will not understand the FSK request (and, indeed, will not even be attempting to receive or process such a request). In this situation, no valid ASK response will be received by device 12 during the additional waiting period. The operations of device 12 may therefore proceed to blocks 76 and 78, where device 12 attempts to communicate with the wireless power receiving device using the second protocol instead of the first protocol. During the operations of block 76, device 12 may stop and start wireless power transmission (e.g., by powering down and restarting). During the operations of block 78, because device 12 now knows that the wireless power receiving device is not compatible with the first wireless charging protocol, device 12 does not transmit the FSK request (as would normally be done in accordance with the first protocol), but instead awaits an ASK request packet from the wireless power receiving device, as expected in accordance with the second protocol.

If device 12 waits a predetermined time (e.g., 50-500 ms, at least 10 ms, at least 50 ms, at least 100 ms, less than 250 ms, etc.) and no ASK request pursuant to the second protocol has been received (e.g., device 24 has failed to transmit an ASK packet within this waiting period), device 12 can conclude that the suspected wireless power receiving device is instead a foreign object such as a coin or is a device that is compliant with an incompatible wireless charging protocol. Device 12 therefore declines to transmit wireless power (block 82).

If device 12 receives an ASK request packet pursuant to the second protocol while device 12 is within the waiting period for this request, the ASK request packet can specify a desired level of power to transmit from device 12 to device 24. Accordingly, in response to receipt of an ASK request compliant with the second protocol, device 12 transmits wireless power at the requested power level (block 80).

A second possible response to the FSK packet transmitted at block 74 arises when a single wireless power receiving device compliant with the first protocol responds to the FSK packet with a corresponding ASK response packet. The ASK response may specify a desired amount of wireless power for device 12 to deliver to the wireless power receiving device. Upon receipt of a valid ASK response from the wireless power receiving device (RX) that is compliant with the first protocol, device 12 (TX) responds with an additional FSK packet that assigns an address to the wireless power receiving device. This address is used by devices 12 and 24 during subsequent in-band communications. For example, the address is used during the operations of block 86, in which device 24 and device 12 communicate to negotiate an appropriate wireless power transmission level for device 12. During block 86, device 24 sends device 12 an ASK request packet that asks device 12 to transmit a desired amount of power. During block 88, device 12 responds by providing the requested power, by providing an amount of power that is less than the requested power, or by providing no power, as appropriate (e.g., satisfying constraints on available power, etc.).

A third possible response to the FSK packet transmitted at block 74 involves a scenario in which multiple wireless power receiving devices that are compliant with the first protocol are responsive and send ASK packets within the waiting period. In this scenario, device 12 uses a probabilistic anti-collision process to assign unique addresses to each of the multiple wireless power receiving devices (e.g., by transmitting FSK packets with the addresses to each of the devices). Processing may then continue at block 86 (e.g., so that power transmission settings can be negotiated and power provided at block 88).

The operations of FIG. 4 may be used to disambiguate between devices operating in accordance with different protocols, even if the devices are operating at the same wireless power frequency or frequency range (e.g., even if the first protocol and second protocol both involve transmission of wireless power and transmission of data using the same or similar wireless power transmission frequency).

The foregoing is merely illustrative and various modifications can be made to the described embodiments. The foregoing embodiments may be implemented individually or in any combination.

What is claimed is:

1. A wireless power transmitting device, comprising:
   control circuitry including wireless transceiver circuitry and external object measurement circuitry; and
   wireless power transmitting circuitry including a coil configured to be driven with alternating-current signals at a frequency to transmit wireless power, wherein the control circuitry is configured to:
      use the external object measurement circuitry to monitor the coil for presence of an external object;
      in response to detection of an external object with the external object measurement circuitry, use the wireless transceiver circuitry to transmit a frequency-shift-keying packet with the coil in accordance with a first wireless charging protocol by modulating the frequency using frequency-shift keying modulation; and
      in response to not receiving an amplitude-shift-keying response packet within a time period after transmitting the frequency-shift-keying packet, attempting to wirelessly communicate with a wireless power receiving device using a second wireless charging protocol that is different than the first wireless charging protocol, wherein attempting to wirelessly communicate with the wireless power receiving device using the second wireless charging protocol comprises stopping and restarting wireless power transmission with the coil and awaiting an amplitude-shift-keying request packet.

2. The wireless power transmitting device defined in claim 1 wherein the control circuitry is further configured to:
   in response to receiving an amplitude-shift-keying response packet with the wireless transceiver circuitry and the coil within the time period, use the wireless transceiver circuitry to transmit a frequency-shift-keying packet with the coil that assigns an address.

3. The wireless power transmitting device defined in claim 2 wherein the control circuitry is further configured to:
use the address in in-band communications to negotiate an amount of wireless power to transmit with the wireless power transmitting circuitry.

4. The wireless power transmitting device defined in claim 3 wherein the control circuitry is further configured to:
use the wireless power transmitting circuitry to wirelessly transmit the amount of wireless power with the coil.

5. The wireless power transmitting device defined in claim 1 wherein the control circuitry is further configured to:
in response to receiving multiple amplitude-shift-keying response packets with the wireless transceiver circuitry and the coil within the time period, use a probabilistic anti-collision process to assign multiple addresses to multiple respective wireless power receiving devices.

6. The wireless power transmitting device defined in claim 1 wherein external object measurement circuitry comprises a signal generator that applies a signal to the coil.

7. A wireless power transmitting device, comprising:
control circuitry including wireless transceiver circuitry; and
wireless power transmitting circuitry including a coil configured to be driven with alternating-current signals at a frequency, wherein the control circuitry is configured to:
use the wireless power transmitting circuitry to begin transmitting wireless power;
after transmitting the wireless power for a first time period, use the wireless transceiver circuitry to transmit a frequency-shift-keying packet with the coil by modulating the frequency using frequency-shift keying modulation; and
in response to receiving, from a wireless power receiving device, an amplitude-shift-keying response to the frequency-shift-keying packet with the wireless transceiver circuitry and the coil within a second time period following transmission of the frequency-shift-keying packet, assign an address to the wireless power receiving device and use the wireless transceiver circuit to transmit the address to the wireless power receiving device with the coil.

8. The wireless power transmitting device defined in claim 7 wherein transmission of the frequency-shift-keying packet is compliant with a first wireless charging protocol and wherein the control circuitry is further configured to:
in response to failing to receive an amplitude-shift-keying response to the frequency-shift-keying packet within the second time period, attempt to wirelessly communicate with a wireless power receiving device using a second wireless charging protocol that is different than the first wireless charging protocol.

9. The wireless power transmitting device defined in claim 8 wherein the coil is one of an array of coils coupled to the wireless power transmitting circuitry.

10. The wireless power transmitting device defined in claim 9 further comprising measurement circuitry coupled to the coils to detect objects.

11. The wireless power transmitting device defined in claim 10 wherein the control circuitry is further configured to:
transmit the frequency-shift-keying packet in response to detection of an object with the measurement circuitry.

12. The wireless power transmitting device defined in claim 7 wherein the control circuitry is further configured to:
use the address to communicate with a wireless power receiving device to negotiate an amount of wireless power to transmit to the wireless power receiving device with the power transmitting circuitry.

13. The wireless power transmitting device defined in claim 12 wherein the control circuitry is further configured to:
use the power transmitting circuitry to wirelessly transmit the amount of wireless power with the coil.

14. The wireless power transmitting device defined in claim 7 wherein the control circuitry is further configured to:
in response to receiving multiple amplitude-shift-keying response packets within the second time period, use a probabilistic anti-collision process to assign multiple addresses to multiple respective wireless power receiving devices.

15. A wireless power system, comprising:
a wireless power transmitting device having a coil and configured to:
transmit wireless power with the coil;
after transmitting the wireless power for a first time period, transmit an in-band frequency-shift-keying packet using the coil;
after transmitting the in-band frequency-shift-keying packet, monitor for in-band amplitude-shift-keying response packets for a second time period; and
in response to not receiving any in-band amplitude-shift-keying response packets within the second time period, stop and restart wireless power transmission with the coil and await an amplitude-shift-keying request packet;
a first wireless power receiving device that is configured to transmit an amplitude-shift-keying response packet in response to the frequency-shift-keying packet in accordance with a first wireless charging communications protocol; and
a second wireless power receiving device that is configured to not transmit any amplitude-shift-keying responses in response to the frequency-shift-keying packet in accordance with a second wireless charging communications protocol that is different than the first wireless charging communications protocol.

16. The wireless power system defined in claim 15 wherein the wireless power transmitting device is further configured to:
in response to receiving the amplitude-shift-keying response packet from the first wireless power receiving device, transmit a frequency-shift-keying packet with the coil that assigns an address.

17. The wireless power system defined in claim 16 wherein the wireless power transmitting device is further configured to:
monitor the coil for presence of an external object; and
begin the transmission of the wireless power in response to detection of the external object.

* * * * *